United States Patent
Shi

(10) Patent No.: US 11,370,587 B2
(45) Date of Patent: Jun. 28, 2022

(54) AROMA PENETRATION HEAT SEAL LINER AND METHOD OF SEALING A CONTAINER

(71) Applicant: Tekni-Plex, Inc., Wayne, PA (US)

(72) Inventor: Guangda Shi, Perrysburg, OH (US)

(73) Assignee: Tekni-Plex, Inc., Wayne, PA (US)

(*) Notice: Subject to any disclaimer, the term of this patent is extended or adjusted under 35 U.S.C. 154(b) by 174 days.

(21) Appl. No.: 16/702,911

(22) Filed: Dec. 4, 2019

(65) Prior Publication Data
US 2021/0171255 A1 Jun. 10, 2021

(51) Int. Cl.
| | |
|---|---|
| B65D 53/04 | (2006.01) |
| B32B 15/12 | (2006.01) |
| B32B 38/04 | (2006.01) |
| B65B 7/28 | (2006.01) |
| B65D 65/40 | (2006.01) |

(52) U.S. Cl.
CPC .......... *B65D 53/04* (2013.01); *B32B 15/12* (2013.01); *B32B 38/04* (2013.01); *B65B 7/2878* (2013.01); *B65D 65/40* (2013.01); *B32B 2038/047* (2013.01); *B32B 2435/02* (2013.01)

(58) Field of Classification Search
CPC .. A45D 2200/051; B32B 15/08; B32B 15/12; B32B 15/20; B32B 2038/047; B32B 2250/03; B32B 2307/202; B32B 2307/31; B32B 2307/4023; B32B 2307/724; B32B 2435/02; B32B 2439/70; B32B 38/04; B32B 3/02; B32B 3/266; B32B 7/12; B65B 7/2878; B65D 2251/0015; B65D 2251/0025; B65D 2251/0093; B65D 51/20; B65D 53/04; B65D 65/40; B26F 1/18
See application file for complete search history.

(56) References Cited

U.S. PATENT DOCUMENTS

| | | |
|---|---|---|
| 3,448,882 A | 6/1969 | Roy |
| 3,951,293 A | 4/1976 | Schulz |
| (Continued) | | |

FOREIGN PATENT DOCUMENTS

| | | |
|---|---|---|
| BR | PI0701458 B1 | 1/2008 |
| BR | 102012030115-6 | 9/2014 |
| (Continued) | | |

OTHER PUBLICATIONS

Engllsh translation of BRPI0701458.*
(Continued)

*Primary Examiner* — Sonya M Sengupta
(74) *Attorney, Agent, or Firm* — Polsinelli, PC

(57) ABSTRACT

A non-venting one-piece, partially perforated multilayer induction heat seal liner for a container that allows an aroma or scent from a solid substance within the sealed container to permeate through the liner, while preventing leakage and/or physical contact of the substance by the consumer. The liner includes a partial perforation extending completely through a metal foil layer, and leaving an un-perforated thickness in a paper layer. The partial perforation will allow a prospective customer to sniff the scent or aroma released through the partial perforation, while the liner remains secured to the container, extending shelf life of the substance, and preventing leakage, as well as, contamination, damage and/or reduced volume caused by consumers sampling the substance/product within the container.

22 Claims, 7 Drawing Sheets

(56) References Cited

U.S. PATENT DOCUMENTS

| | | |
|---|---|---|
| 4,863,051 A | 9/1989 | Eibner et al. |
| 5,176,271 A | 1/1993 | Painchaud et al. |
| 5,433,992 A | 7/1995 | Galda et al. |
| 5,688,544 A | 11/1997 | Bolton |
| 5,730,306 A | 3/1998 | Costa et al. |
| 6,065,642 A | 5/2000 | Brown |
| 6,497,336 B2 | 12/2002 | Grayer |
| 6,602,309 B2 | 8/2003 | Vizulis et al. |
| 7,163,113 B2 | 1/2007 | Manganiello et al. |
| 7,648,764 B2 | 1/2010 | Yousif |
| 7,909,204 B2 | 3/2011 | Antal, Sr. |
| 7,959,028 B2 | 6/2011 | Leon |
| 8,225,954 B1 | 7/2012 | Triquet |
| 9,708,110 B2 | 7/2017 | Walsh |
| 9,834,331 B2 * | 12/2017 | Bruna ................ B65D 51/1605 |
| 2001/0023870 A1 | 9/2001 | Mihalov et al. |
| 2004/0262418 A1 | 12/2004 | Smith et al. |
| 2005/0252918 A1 | 11/2005 | McKnight et al. |
| 2006/0228620 A1 | 10/2006 | Martinson et al. |
| 2008/0260917 A1 | 10/2008 | Sankey et al. |
| 2009/0250464 A1 | 10/2009 | Jongsma et al. |
| 2012/0111758 A1 | 5/2012 | Lo et al. |
| 2013/0341325 A1 | 12/2013 | Bruna |
| 2014/0061196 A1 | 3/2014 | Thorstensen-Woll |
| 2014/0076898 A1 | 3/2014 | Wiening |
| 2016/0257438 A1 | 9/2016 | Van Landeghem et al. |

FOREIGN PATENT DOCUMENTS

| | | |
|---|---|---|
| EP | 0835818 A2 | 4/1998 |
| FR | 2807402 | 10/2001 |

OTHER PUBLICATIONS

English translation of FR2807402.*
Engllsh translation of EP0835818.*
International Search Report and Written Opinion in related international application No. PCT/US2020-062659 dated Jun. 2, 2021.
International Preliminary Report on Patentability in related international application No. PCT/US2020/062659 dated Mar. 11, 2022.

* cited by examiner

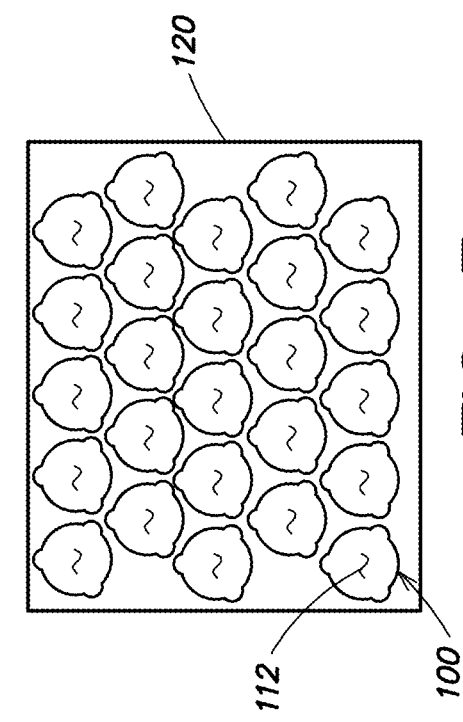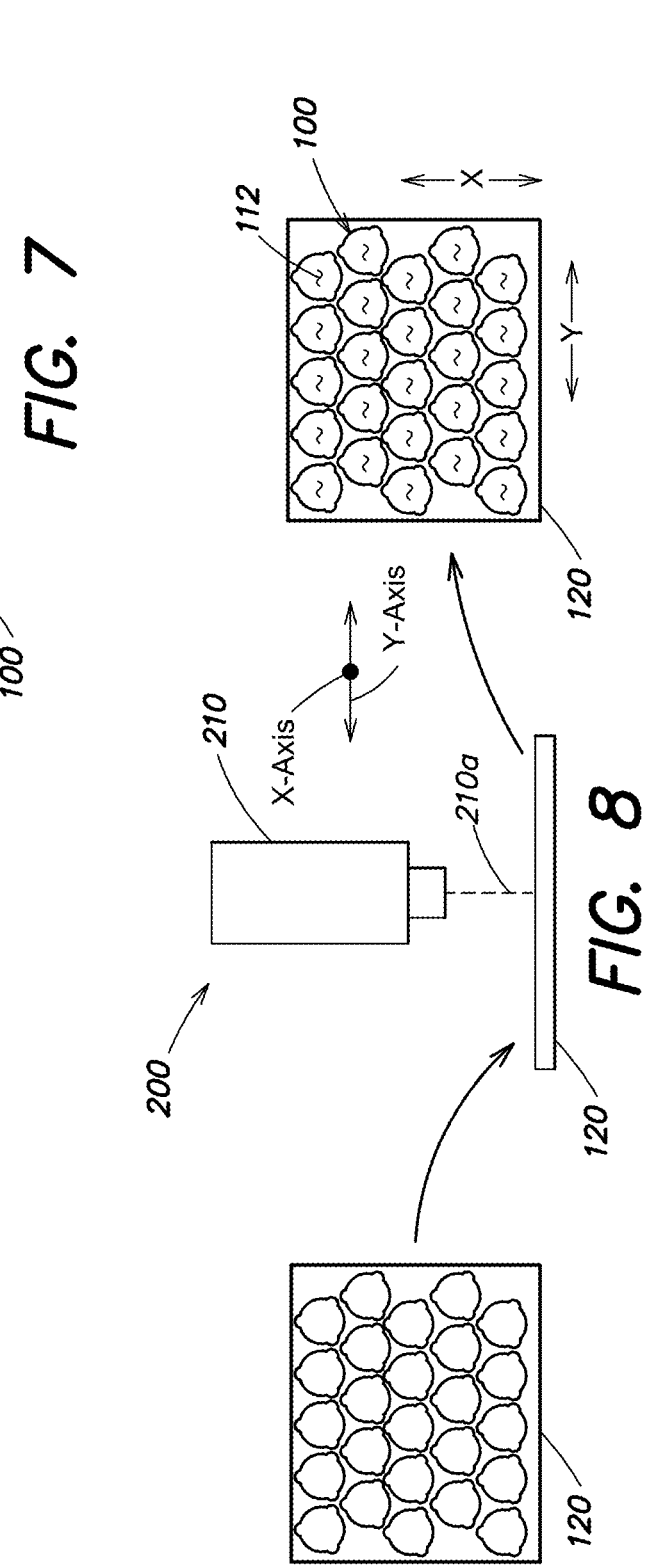

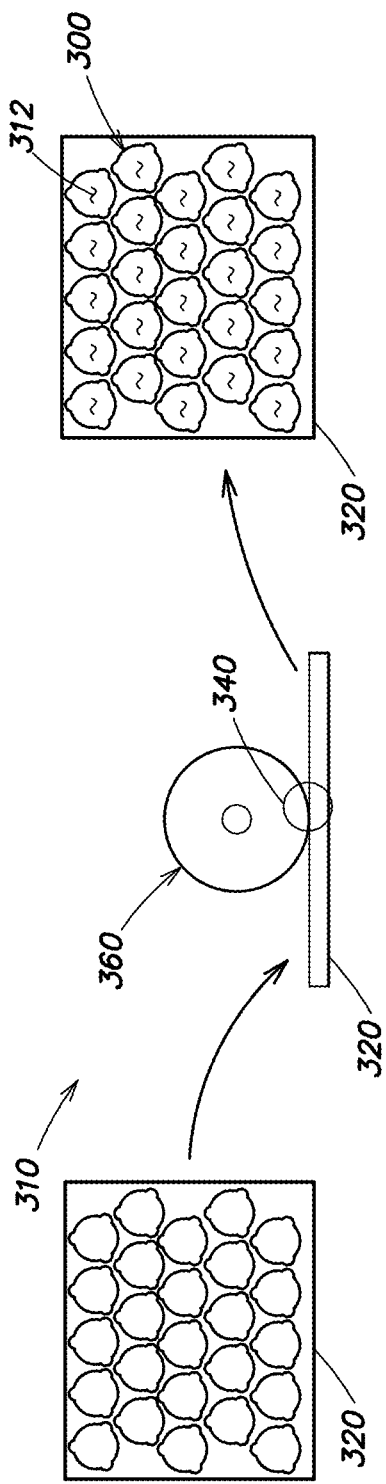
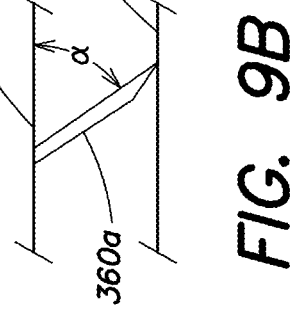
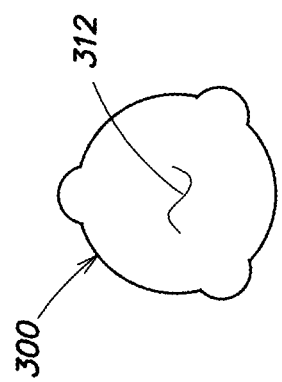
FIG. 9
FIG. 9A
FIG. 9B
FIG. 10

AROMA PENETRATION HEAT SEAL LINER AND METHOD OF SEALING A CONTAINER

FIELD OF THE INVENTION

The present invention relates to an induction heat seal liner for a container that allows an aroma or scent of a substance in the container to permeate the liner.

BACKGROUND

Liners or seals have been used on containers for many years to prevent leakage or contamination and to increase the shelf life of the substance or product held within the container. For example, seals are used on containers for cosmetics, foods, drinks, medicines and other items in the form of liquids, creams, gels, particulates, powders and other substances. Seals for this purpose are typically placed over the opening on the container or, in some instances, within the cap on the container.

However, consumers often want to smell items having a fragrance or aroma, such as lotions, creams, body washes, shampoos, deodorants, perfumes, laundry detergents, air fresheners, coffee and spices, before purchasing the items. Most seals prevent such aroma penetration and as a result, many products are sold without seals, allowing potential consumers free access to the product within the container.

The absence of a seal increases the possibility of spillage during transportation and the chances that a product may be tampered with or tainted prior to sale. It is not uncommon for consumers to go beyond simply removing the cap to smell the product, by actually applying some of the product onto their body to sample it and its fragrance. In so doing, the consumer may stick their fingers into the substance or on the opening where the substance comes out. Oftentimes, after sampling the product, the consumer closes the cap and returns the container to the shelf in the store.

This product sampling causes several problems. The sampler may be contaminating the substance and spreading germs or bacteria. Additionally, each time a consumer samples the product and returns it to the shelf, the volume of the substance within the container decreases. As a result, the consumer that eventually purchases the product is unknowingly purchasing less than a full container and furthermore may be purchasing one that has been contaminated with germs or bacteria.

From the retailer's perspective, consumers that sample products and then return them to the shelf may not place the cap on tightly, which may result in spillage. Additionally, the shelf life of the substance within the container may be reduced. Still further, the absence of a seal may result in the substance accumulating within the cap which is a less appealing presentation to the consumer. These situations may result in the retailer being unable to sell the product, generate product returns or charge-backs, or have adverse effects on the reputation of one or more of the retailer, product manufacturer and distributor. Additionally, these entities may each incur liability if a consumer is harmed by the contaminated product.

Accordingly, there is a need in the art for a seal that allows the scent or aroma from the substance within the container to permeate while leaving the seal intact.

SUMMARY OF THE INVENTION

In one embodiment, the invention is directed to a one-piece non-venting, partially perforated multi-layer induction heat seal liner for containers that provides the following benefits:

1) a complete induction heat seal around the opening to the container, e.g., a 360-degree seal to an annular lip surrounding the opening to the container;
2) protection from tampering (tamper evidence);
3) the aroma or scent from a solid substance within the container can pass through the partial perforations of the sealed liner at an adequate level so as to be detectable by a human nose, without destroying the seal and maintaining tamper evidence;
4) the use of low cost materials, including paper, and low cost manufacturing processes, e.g., for laminating, induction heat sealing and/or partially perforating.

The liner includes in addition to an induction heat seal layer, a metal foil layer that is perforated through the complete thickness of the foil layer, and a paper layer that maintains some un-perforated thickness.

In contrast to prior art seals that add a venting hole and then cover the hole with a permeable membrane, adding greatly to the cost of materials and manufacturing complexity, the liner of the present invention is a non-venting one-piece, multi-layer liner that does not include a venting hole or additional membrane for providing aroma penetration.

In further contrast to prior art seals, the liner of the present invention is configured for sealing and allowing permeation of an aroma or scent of a solid substance or product, and thus does not require a liquid barrier layer (typically a polymer liquid barrier layer). Again, liquid barrier layers add to both the cost of materials and the number and complexity of manufacturing steps. As used herein "solid substance", as opposed to a liquid, means a solid mass, a dry solid in the form of a powder, particulate or granular substance, and further includes creams or gels so long as they maintain a fixed shape in the container at the intended product storage temperature and are not flowing liquids.

In one embodiment the aroma or scent permeation of the liner is sufficient for detecting (via an unaided human nose, through the liner) a solid food substance such as coffee (e.g., beans or granules), or a spice substance (such as black pepper, cinnamon, garlic or oregano, which are typically provided in a granular or powder form). Most solid substances emit a lower scent concentration than a liquid because the aroma or scent diffuses through a solid material at a much slower rate than through a liquid material. The liner of the present invention can function effectively at the relatively lower scent concentration (volatility) levels of solid substances and still enable detection by an unaided human nose.

A key component of the multi-layer induction heat seal liner of the present invention is providing a paper layer that is not fully perforated, i.e., only partially perforated, or fully un-perforated. It has been found that paper will allow for detection of a lower volatility scent, such as emitted by the dry food substances listed above. The inventors have found that as long as the metal foil layer (configured to be heated and to transfer heat to the heat seal layer) is perforated completely there through, then the paper layer can retain the other required elements of providing aroma detection and preventing physical access by the consumer to the substance in the container (thus preventing contamination, spillage and loss of product volume, preserve tamper evidence, and extend shelf life). There is no need for expensive permeable membranes or patches, no venting holes, and no need for a liquid barrier layer. Further, the paper layer can optionally be printed for aesthetic, informational, product display, identification and/or other purposes and still retains its essential functionality.

In accordance with one embodiment of the invention, a method of sealing a container is provided that allows for aroma or scent detection of a solid substance held in the sealed container, the method comprising the steps of:
- providing a container having an opening in communication with an internal chamber;
- providing a solid substance having an aroma or scent in the internal chamber;
- providing a non-venting one-piece, partially perforated multilayer induction heat seal liner including a bottom heat seal layer for sealing around the opening of the container, a paper layer, and a metal foil layer between the heat seal layer and the paper layer; and
- affixing by inductive heat sealing the bottom heat seal layer of the liner around the opening to restrict access to the solid substance in the internal chamber while allowing the aroma or scent thereof to permeate through the partially perforated liner for detection by a human nose;
- the liner being configured to allow for said detection via a partial perforation extending in a thickness direction completely through the metal foil layer and in a range of 2% to 99% of a total liner thickness, leaving the paper layer with an unperforated thickness that permits permeation for said detection, and wherein the liner does not include either a liquid barrier layer or a gas permeable vent.

In one embodiment, the solid substance is one or more of: a) a solid mass, b) a solid in the form of a powder, particulate or granular substance, and c) a cream or gel that maintains a fixed shape in the container and is not a flowing liquid.

In one embodiment, the total liner thickness is in a range of 1.5 mils to 57 mils.

In one embodiment, the partial perforation is formed by a laser or mechanical cutting.

In one embodiment, the partial perforation includes one or more partial perforations in the form of a curved, linear, arrow or wave shape.

In one embodiment, the length, width, depth and angle of the partial perforation is configured to allow the aroma or scent of the solid substance in the chamber to permeate through the partial perforation including the un-perforated thickness of the paper layer, and to restrict leakage by the solid substance through the liner.

In one embodiment, the liner includes a further layer or coating having printed or informational content, and wherein the further layer or coating is configured to allow the aroma or scent of the solid substance in the chamber to permeate through the partial perforation including the un-perforated thickness of the paper layer.

In one embodiment,
the paper layer has a thickness in a range of 1-50 mil;
the metal foil layer has a thickness in a range of 0.3-3.5 mil;
the heat seal layer has a thickness in a range of 0.2-3.5 mil.

In one embodiment,
the liner has a total thickness in a range of 1.5 mil-57 mil.

In one embodiment, the solid substance is a food substance.

In one embodiment, the food substance is selected from one or more of coffee and spice.

In one embodiment, the paper layer comprises wood fiber or other cellulosic fiber.

In one embodiment, the partial perforation extends completely through both the metal foil layer and the heat seal layer.

In one embodiment, the paper layer is comprised of greater than 80% cellulosic fiber.

In one embodiment, the partial perforation leaves an unperforated thickness of the paper layer of at least 1% of the total paper layer thickness.

In one embodiment, the partial perforation leaves an unperforated thickness of the paper layer of at least 50% of the total paper layer thickness.

In one embodiment, the partial perforation leaves an unperforated thickness of the paper layer of at least 80% of the total paper layer thickness.

In accordance with another embodiment of the invention, an induction heat seal liner is provided for a container that allows for aroma or scent detection of a solid substance contained in the sealed container, the liner comprising:
- a non-venting one-piece, partially perforated multilayer induction heat seal liner configured to be sealed around an opening of a container that communicates with an internal chamber holding a solid substance having an aroma or scent; the liner including a bottom heat seal layer for sealing around the opening of the container, a paper layer, and a metal foil layer between the bottom heat seal layer and the paper layer;
- the bottom heat seal layer being affixed by inductive heat sealing around the opening to restrict access to the solid substance in the internal chamber while allowing the aroma or scent thereof to permeate through the partially perforated liner for detection by a human nose;
- the liner being configured to allow for said detection via a partial perforation extending in a thickness direction completely through the metal foil layer and in a range of 2% to 99% of a total liner thickness, leaving the paper layer with an unperforated thickness that permits permeation for said detection, and wherein the liner does not include either a liquid barrier layer or a gas permeable vent.

In one embodiment, the length, width, depth and angle of the partial perforation is configured to allow the aroma or scent of the solid substance in the chamber to permeate through the partial perforation including the un-perforated thickness of the paper layer, and to restrict leakage by the solid substance through the liner.

In one embodiment,
the paper layer has a thickness in a range of 1-50 mil;
the metal foil layer has a thickness in a range of 0.3-3.5 mil;
the heat seal layer has a thickness in a range of 0.2-3.5 mil.

In one embodiment,
the liner has a total thickness in a range of 1.5 mil-57 mil.

In one embodiment, the partial perforation extends completely through both the metal foil layer and the heat seal layer.

In one embodiment, sealed container is provided comprising the liner of the invention seal bonded around the opening of a container having an internal chamber holding a solid substance having an aroma or scent.

In one embodiment, a method is provided for making the liner of the invention, comprising the steps of:
- providing a multi-layer liner material comprising layers of the heat seal, paper and metal foil layers;
- making the partial perforation using laser ablation or mechanical cutting; and
- after the partial perforation making step, cutting the liner from the multi-layer liner material.

In one embodiment, in the partial perforation making step, the laser ablation or mechanical cutting controls at least one of the width, depth and angle of the partial perforation in the liner material.

In one embodiment, the liner material includes at least one further layer that permits permeation of the aroma or scent for said detection.

In one embodiment, the mechanical cutting utilizes at least one blade disposed at an angle to the thickness of the material for forming the partial perforation at said angle to the liner thickness direction.

BRIEF DESCRIPTION OF THE DRAWINGS

There is shown in the drawings one or more exemplary embodiments, it being understood however, that the invention is not limited to the specific articles and methods disclosed. Additionally, like reference numerals represent like items throughout the drawings.

FIG. 6A is an exploded view of a stack of aroma permeating liners in accordance with a further embodiment of the invention, each liner having a single partial perforation;

FIG. 6B is an exploded view of a stack of aroma permeating liners in accordance with still a further embodiment of the invention, each liner having three partial perforations;

FIG. 7 is a top plan view of a sheet or web including multiple aroma permeating liners in accordance with one embodiment of the invention;

FIG. 8 is an illustration of an apparatus and a method of partially perforating with a laser multiple aroma permeating liners in a web, in accordance with one embodiment of the invention;

FIG. 9 is an illustration of an apparatus and a method of partially perforating with a rotary cutting tool multiple aroma permeating liners in a web, in accordance with another embodiment of the invention;

FIG. 9A is an enlargement of a portion of FIG. 9;

FIG. 9B is a portion of the view of FIG. 9A, from one side, showing an angled cutting blade;

FIG. 10 is a bottom plan view of an aroma permeating liner having a partial perforation formed at an angle to the bottom planar surface of the liner, in accordance with another embodiment of the invention;

DETAILED DESCRIPTION

Figure 2:
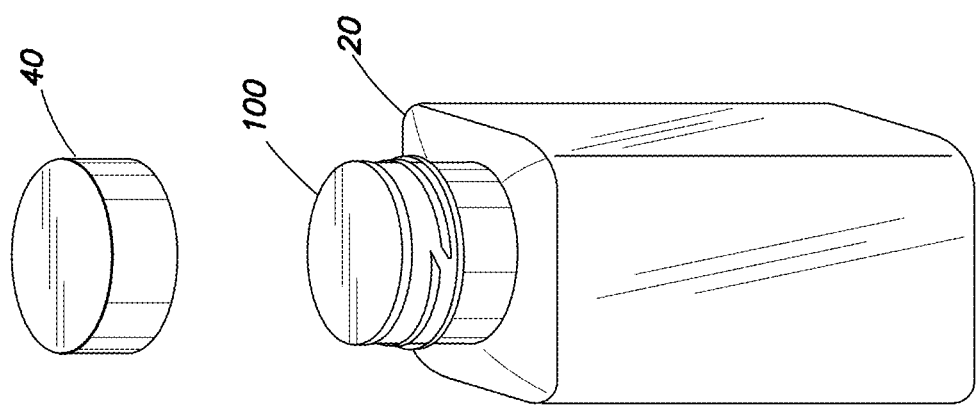
FIG. 2 shows the liner of FIG. 1 now attached (induction heat sealed) to the mouth of the container.

Referring to FIGS. 1-3C, there is shown one embodiment of a partially-perforated aroma or scent releasing (permeable) induction heat seal liner 100. The liner is configured to be sealed over an opening or mouth 22 to an internal chamber 23 of the container holding a solid substance 4. A removable closure or cap 40 (here a threaded cap) is then applied over the liner and sealed opening of the container.

Figure 1:
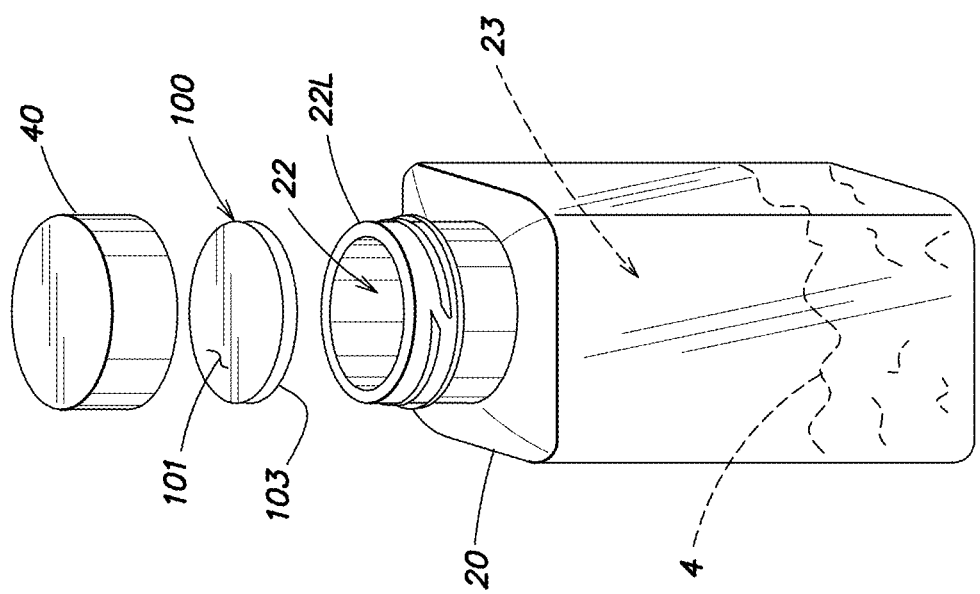
FIG. 1 is a front perspective view of an aroma or scent permeating, partially perforated multi-layer liner positioned between the mouth of a container for holding a solid substance (e.g., a solid food spice such as pepper or oregano) and a removable threaded cap, in accordance with one embodiment of the invention.

The liner 100 may be used on a variety of containers for holding various food, cosmetic, confectionery, household and other products in the form of solid substances 4 (as previously defined), so as to permit the aroma or scent of the solid substance in the container chamber to be released (permeate) through the partially perforated liner, without providing a prospective purchaser (consumer) physical access to the product (substance 4). Note that, for the purposes of the present application, the terms "scent" and "aroma" and "fragrance" are used interchangeably. In the embodiment of FIG. 1, the solid substance 4 in the container is a food spice, namely ground black pepper, in the form of a dry granular material.

Figure 3A:
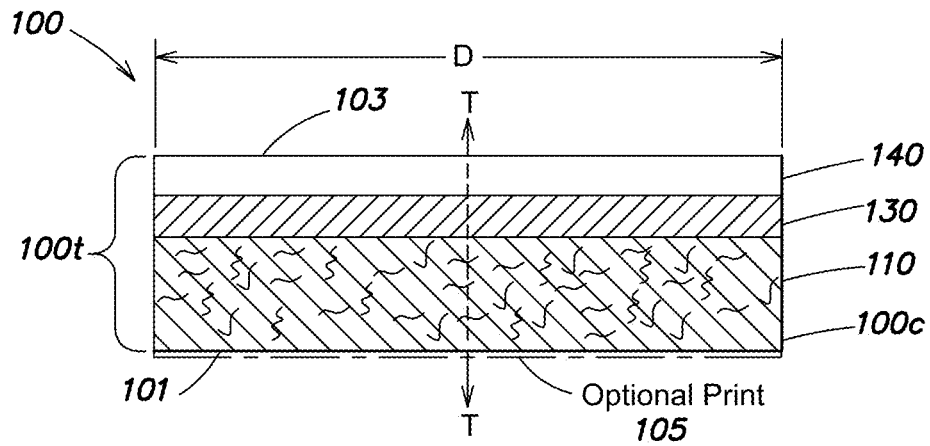
FIG. 3A is a cross sectional schematic view of a multilayer liner similar to that of FIG. 1 but prior to partial perforation, showing the various layers.
Figure 3B:
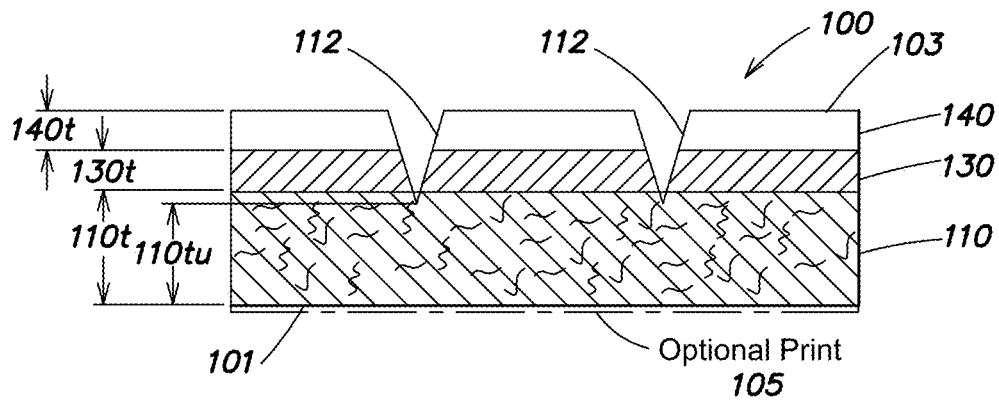
FIG. 3B shows the same liner now with a partial perforation extending completely through the heat seal and metal foil layers, but not extending completely through the paper layer.
Figure 3C:
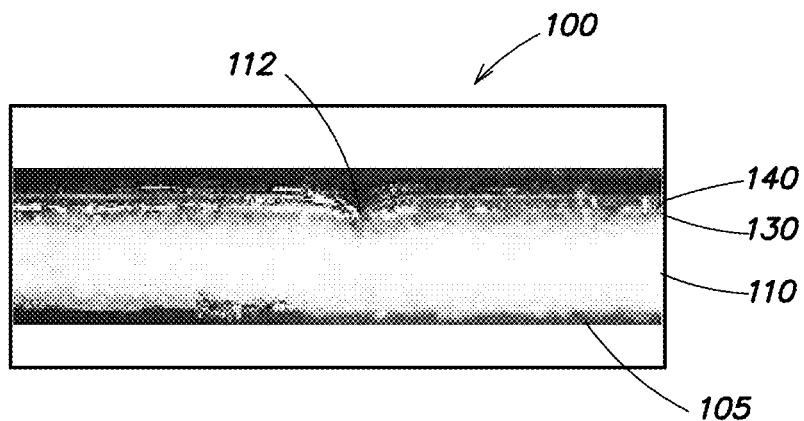
FIG. 3C is a cross sectional photographic view similar to FIG. 3B of an actual multi-layer partially perorated liner.

The liner 100 has a one-piece non-venting, multi-layer construction, including in relative serial order in a liner thickness T direction transverse to opposing top planar surface 101 and bottom planar surface 103 respectively (as shown in FIGS. 3A-3C): a top paper layer 110, a middle layer of metal (here aluminum) foil 130 for inductive heating, and a bottom heat seal layer 140. It should be noted that more or fewer layers, or layers of other materials than listed herein, may be used without departing from the present invention. For example, adhesives or other bonding materials may be provided between the layers 110/130/140. Alternatively, one or more layers may include printed information or designs, e.g., in the form of a varnish or coating with inks or dyes. In one embodiment (see FIGS. 3A-3B) a further such printed or informational layer 105 is provided on the outermost top surface of the liner, above the paper layer 110 and facing the consumer when the closure is removed from the sealed container.

In accordance with the present invention, the liner 100 includes at least one partial perforation 112 in the liner thickness direction T for permitting the aroma of the substance 4 contained within the chamber 23 of the sealed container 20 to pass through (permeate) the liner 100 without breaking the heat seal bond between the liner 10 and the area around the opening 22, and without allowing a consumer access to the product/substance 4 in the sealed container.

Figure 5:
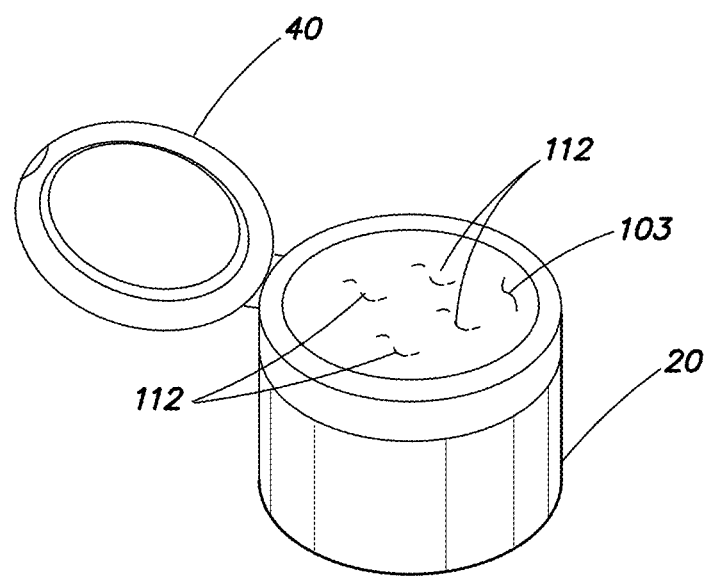
FIG. 5 is a partial exploded view of an aroma or scent permeating liner sealed to the mouth of a container with an alternative a flip-top lid according to another embodiment of the invention; the liner of this embodiment has a different pattern of four partial perforations (extending into the bottom liner surface and through at least the heat seal and metal foil layers, but not extending completely through the top paper layer and thus not visible from the top liner surface, being shown in dashed lines)

By providing at least one partial perforation 112 in particular layer(s) of the liner as described above, the aroma or scent can exit from the sealed container chamber 23 through the liner, but a prospective consumer's fingers cannot pass through the liner into the opening 22 of the container to the product 4 below. More particularly, the containers 20 are filled through the opening 22 (or through another orifice of the container that communicates with the chamber 23) and a liner 100 is sealed around the opening 22 to allow a prospective consumer to detect a scent or aroma from the substance 4 through the sealed liner without the need for removing the liner from the container. The liner 100 can be used with different types of containers 20 and different types of closures or caps 40, such as a threaded cap (FIGS. 1-2), a snap-closed or flip-top cap (see FIG. 5), or other types of caps known in the industry. In the embodiment of FIGS. 1-2, the liner 100 is heat seal bonded at its lower-most (bottom) surface 103 to an annular (circumferential) lip 22L of the container 20 surrounding the opening 22, and the cap 40 is closed (threaded) there over.

By leaving at least a portion 110tu of the total paper layer thickness 110t intact (un-perforated), as shown in FIGS. 3B and 3C), the liner of the present invention eliminates any need for a further barrier layer, membrane or material to be laminated to the liner. Thus, in one embodiment, a one-piece non-venting, multi-layer induction seal liner 100 is provided with one or more partial perforations that extend in and completely through the heat seal 140 and metal foil 130 layer thicknesses 140t and 130t respectively, starting from the bottom face 103 of the liner, and extending no more than partially through the paper layer 110 (leaving an uncut thickness portion 110tu of the paper layer 110 intact) to permit an aroma or scent to permeate from the substance 4 in the container, through the uncut thickness portion 110tu of the liner 100, while preventing access, leakage, contamination and venting through the liner.

In the present embodiment, the liner 100 is a generally disc-shaped (circular) article having a diameter D, with parallel and opposing top 101 and bottom 103 planar faces each with a matching circular circumference 100c, and a transverse liner thickness 100t which is relatively thin compared to the diameter D (note in FIGS. 3A-3B the liner thickness and diameter are not shown to scale, as the liner thickness 100t would more typically be on the order of 0.05 to 0.4% of the liner diameter D). In one embodiment the total liner thickness 100t is in a range of 1.5 mil to 57 mil. A mil is a unit of length equal to one thousandth of an inch (0.0254 millimeter).

In another embodiment (see FIGS. 6A-8), the liner 100 includes one or more tabs 118 around the circumferential edge 100c. This is not meant to be limiting, as no tabs and/or other shapes of liner may be used. For example, an oval or rectangular liner may be provided to seal an oblong or rectangular opening or mouth, without departing from the present invention.

The liner 100 is affixed by a heat seal bond (via bottom heat seal layer 140) to an area (here annular lip 22L) around the opening 22 of the container 20, thus completely covering and sealing around the opening. The liner can then later be peeled off (by the ultimate purchaser/consumer) to access the contents 4 of the container. Typically the liner 100 can be peeled off using a fingernail or, in embodiments having a tab 118, by grasping the tab between the thumb and forefinger to facilitate removal of the liner 100 from the opening 22 of the container 20.

In the embodiment shown in FIGS. 1-3, the liner includes two partial perforations 112. In other embodiments, the liner includes one partial perforation 112 (FIGS. 6A, 7-8, and 10), three partial perforations 112 (FIG. 6B), four partial perforations 112 (FIG. 5) or more than four perforations (FIG. 11A). The perforations can be provided in matched (FIG. 6B) or offset (FIGS. 5 and 11A) patterns, and as shown may be a curved, linear, arrow or any other shape, As noted previously, it is the un-perforated thickness 110tu of the paper layer that allows for the permeation of the aroma or scent through the liner without allowing physical access to the product 4. The partial perforation must however extend completely through the metal foil layer 130. The perforation typically extends through the heat seal bond 140 thickness as well, assuming the heat seal bond layer extends over the perforated area of the metal foil layer. In some embodiments the heat seal bond layer may be limited to a perimeter area of the liner, as this is all that is required for sealing around the opening of the container.

The length, width, depth and angle of the partial perforations 112 are structured to allow the scent of the substance within the container 20 to permeate through the partial perforations, while preventing leakage out through the partial perforations by the substance or product within the container, and while providing a physical barrier to the consumer (preventing access to the product). The length, width, depth and angle of the partial perforations 112 may vary depending upon the substance 4 to be placed within the container 20 and a desired concentration of aroma (or sniff) detection, and/or leak and barrier requirements of the product manufacturer. For example, the number and depth of partial perforations 112 may vary depending upon the strength of the aroma within the closed container. As an example, only one perforation 112 may be sufficient for aroma detection for containers holding more fragrant/aromatic substances, whereas multiple perforations 112 may be used for containers holding less volatile (relatively less fragrant/aromatic) substances, so that the relatively less fragrant/aromatic substance has a greater opportunity to permeate the liner 100 and be detected (by the unaided human nose) outside of the sealed container.

The un-perforated thickness 110tu area of the paper layer 110 of the liner 100, although permitting permeation of the scent, does not permit venting (the release of gas from within the container to the exterior) to occur through the liner 100. Thus, the liner 100 is a non-venting liner. More particularly, the intact paper layer thickness 110tu area of the liner 100 does not permit a free flow of air or gas from inside the container 20 to the outside of the container 20, or vice versa.

The container 20 may be composed of any materials capable of providing a tamper evident, removable induction heat seal secured to the container and that are suitable for storage of the substance being sold. It may also provide barrier properties as desired. The container 20 may be composed of a polymer material, for example of polyethylene PE, polypropylene PP, polyethylene terephthalate PET or polyvinyl chloride PVC. In another embodiment, the container 20 is glass or metal. Once the liner 100 has been secured over the opening 22 of the container 20, a removable cap 40 is secured to the container 20 over the liner 100. A consumer interested in the product stored within the container 20 may remove the cap 40 and smell the scent or aroma of the stored product 4 released through the partial perforations 112 in the liner 100, without removing the liner and without sampling, tampering with, contaminating and/or spilling the product.

The barrier properties of the liner 100, measured e.g., in terms of oxygen transmission rates (OTR) or moisture vapor transmission rates (MVTR)) can be controlled by adjusting (reducing or increasing) the size, depth and/or number of partial perforations 112 created in the liner 100. In the present invention, the required barrier properties of the sealed container are maintained by the un-perforated paper layer(s) 110.

Referring now to FIG. 7, there is shown a web or sheet of bulk liner material 120 from which a plurality of individual liners 100 are cut or punched. Web 120 is assembled as a one-piece, multi-layer sheet prior to partially perforating and punching the liners 100 from the web sheet. The web 120 is made from a plurality of individual sheets 110/130/140. Subsequently, the partial perforations 112 are formed, and finally, the liners 100 are separated from the composite web sheet 120. Alternately, if desired, liners can be made from strips of multi-layered materials, mounted on reels (see FIG. 12) that are fed through a punching machine to die cut or punch the seal.

Figure 4:
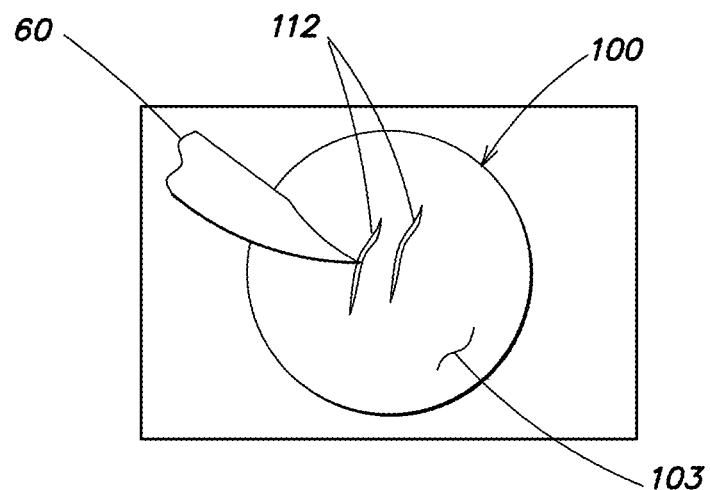
FIG. 4 is a perspective view of a mechanical cutting tool (knife edge) for forming two partial perforations in a liner such as those shown in FIGS. 1-3C, according to one method embodiment.

The liner can be partially perforated by various cutting tools, for example using a rotary cutting tool 360 (FIG. 9), a flat blade or knife 60 (FIG. 4), a laser (FIG. 8), or a pair of rotating scoring rollers 53, 56 (FIGS. 11 and 12) to control the length, width, depth and angle of the partial perforations 112 during the manufacturing process. It should be appreciated, however, that other cutting methods may alternatively be used.

Referring now to FIG. 8, there is shown an apparatus and a method for forming partial perforations 112 in a plurality of liners 100 in accordance with one embodiment of the invention. A multi-layer sheet or web 120 (not yet provided with perforations nor cut into individual liners) is provided to a station 200 including a laser 210. Sheet 120 can be an individual multi-layer sheet 120 (such as the web sheet 120, above), or can be part of a roll of multi-layer sheet material provided to the station 200. Although illustrated as having precut liners 100 on the sheet 120, this is not meant to be limiting. Rather, if desired the sheet 120 can be a bulk sheet 120 (not having the liners precut thereon) when provided to the laser 210, such that the partial perforations 112 are ablated into the bulk material and, subsequently, the individual liners 100 are die cut from the perforated bulk material.

The laser 210 can be any type of laser desired, such as, but not limited to, a gas laser, a fiber laser, a semiconductor laser, etc. The sheet 120 is registered under the laser 210, and the laser 210 is operated to form the perforation 112 in at least part of each liner 100 using ablation performed by a laser beam 210a. The sheet 120 leaves the laser station 200 with partial perforations 112 formed in each liner 100. The liners 100 can then be cut from the sheet 120 to produce individual liners 100. If desired, more than one laser 210 can be provided at the station 200, to increase speed and/or provide for more paths through the station 200.

The use of a laser 210 may be desirable to precisely control the thickness of the resultant partial perforations 112. For example, the laser can be accurately controlled to cut through only the thinnest layers of the liner 100, namely the heat seal 140 and metal foil 130 layers, which are typically only about 10-20% of the total liner thickness. If desired, the laser 210 can be used to cut partially through the paper layer 110 as well, leaving at least some un-perforated thickness 110tu of the paper layer intact as a scent permeable layer that will inhibit leakage of product through that layer and maintaining the barrier properties of the liner 100.

As depicted in FIG. 8 the laser ablation may be performed at a normal incidence to the sheet 120 (i.e., the laser beam 210a being perpendicular to the sheet 120). The perforations 112 can be made at this normal incidence, or can be made at an angle alpha relative to the planar face of the sheet 120 by angling the laser 210 or using a lens system that causes the laser beam 210a to strike the liner 100 at a non-normal angle. Further, the perforation 112 can be formed in the liner 100 in a single pass of the laser beam 210a, or in two or more passes, as desired.

Referring now to FIGS. 9, 9A and 9B, there is shown another embodiment for cutting partial perforations into a multilayer liner 300. In this embodiment, a one-piece, multi-layer web sheet 320 is fed to a rotary cutting station 310 having a rotary cutter 360 with blades 360a. Although shown as having the liners 300 precut on the sheet 320, this is not meant to be limiting, as either precut sheets 320 or bulk sheet material 320 may be provided to the cutting station 310, as desired. Alternately, the rotary cutter 360 can be configured to receive bulk sheet material 320 and cut the liners 300 and partial perforations 312 simultaneously (i.e., with individual liner perimeters being cut all the way through the sheet 320, but the partial perforations 312 being cut through fewer than all layers of the sheet 320).

More particularly, the blades 360a are used to partially perforate the liner 300, while still on the sheet 320, to form the partial perforations 312. Note that, in order to make the partial perforations 312 in all of the liners 300 of a row on the sheet 320, a plurality of blades 360a is aligned with (and thus hidden behind) the blade 360a shown by the enlarged portion 340 of FIG. 9, illustrated in FIG. 9A. The height of the rotary cutter 360 relative to the sheet 320 can be controlled such that the blade 360a cuts through fewer than all layers of the liner 300. Thus, the barrier properties of the liner 300 can be maintained such that permeation (including scent permeation) can occur through the un-perforated paper thickness, but venting and leakage cannot.

Referring now to FIGS. 9-10, in one embodiment, the blades 360a on the rotary cutter 360 are angled by an angle α relative to the surface of the rotary cutter 360 (i.e., a non-normal angle), so as to cut into the sheet 320 at an angle as rolled over the sheet 320. As a result, the partial perforation 312 formed in the liner 300 is angled (as illustrated by FIG. 10) through one or more layers of the seal 300, but less than all of the layers, at a non-normal angle. Such a cut permits scent to permeate from the partial perforation 312, while the angled cut inhibits leakage of product out from the partial perforation 312.

Figure 11:
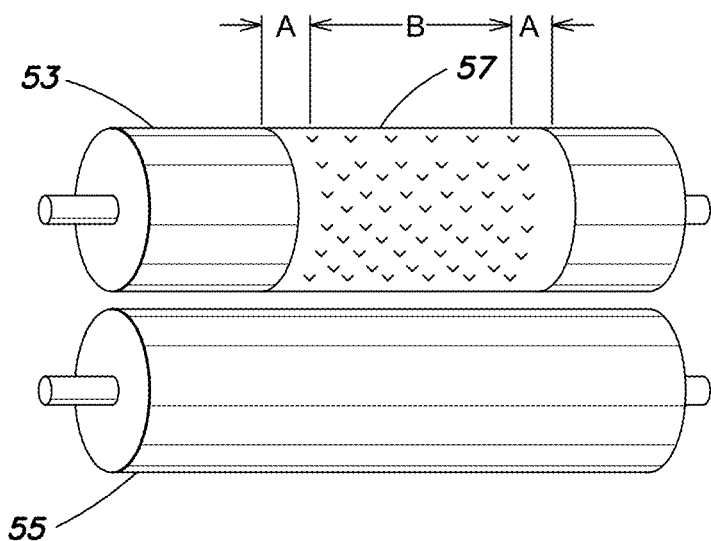
FIG. 11 is a perspective view of a pair of alternating cutting rollers through which a web of bulk liner material is fed to form partial arrow-shaped perforations according to another method embodiment.
Figure 11A:
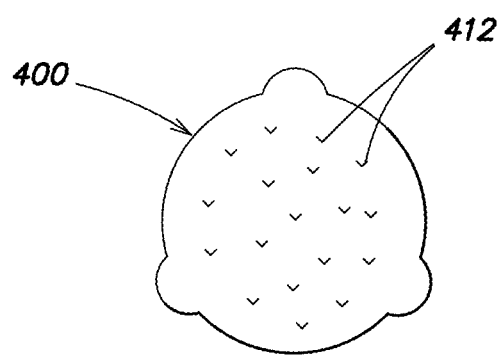
FIG. 11A is a bottom plan view of an aroma permeating liner having a partial arrow-shaped perforations formed by the cutting rollers of FIG. 11.
Figure 12:
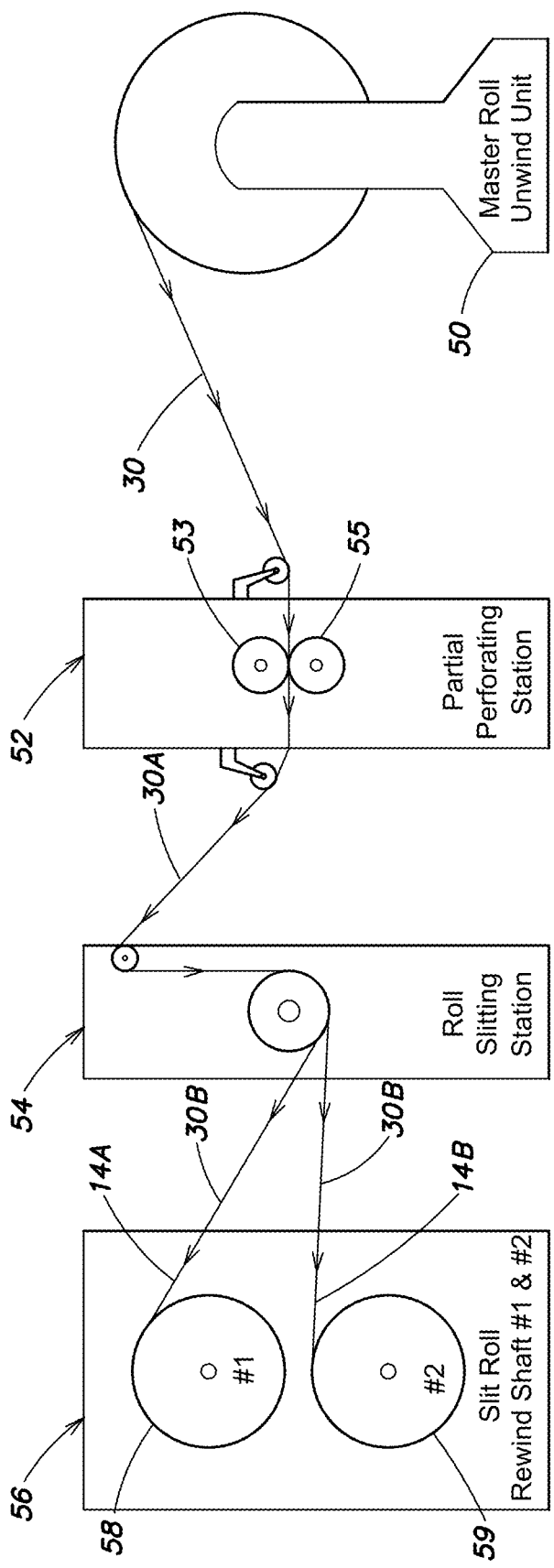
FIG. 12 is a schematic view of a multi-station apparatus and process of unwinding, partially perforating, slitting into rolls, and rewinding a web of liner material to form multiple partially perforated liner rolls according to one method embodiment.

FIGS. 11-12 illustrate another method embodiment for low cost in-line manufacturing of multiple liners from a continuous web of liner material. A master web 30 of lidding film is unrolled from a master roll unwind unit 50 and fed to a partial perforating station 52, where the web is fed between two opposing rollers 53, 55, one roller 53 having formed thereon cutting surfaces 57 for perforating of the web through at least the heat seal and metal foil layers forming partial perforations 412 (as shown in FIG. 11A) in a central area of width B between two non-perforated border areas each of width A; the latter non-perforated areas preserve the mechanical strength of the film during subsequent manufacturing steps, including rolling and unrolling. The partially perforated film 30A is then fed to a slitting station 54 for forming two individual rolls 30B and 30B of scored film, each of the two rolls 30B being wound as separate rolls 58 and 59 onto shafts #1 and #2 at a rewind station 56. The rolls 58 and 59 can be unwound and individual liners punched therefrom, such as a liner 400 having a distributed plurality of partial perforations 412 (shown in FIG. 11A).

As used herein, the paper layer 110 is a sheet of cellulose material, including those materials typically used in the liner industry and referred to as paper, paperboard, board and pulp. The sheet may comprise wood fiber or other cellulose fibers, and may further include fillers, binders, chemical treatment and surface coatings, and may be made of virgin or recycled materials.

The paper layer may be a sheet comprising a heterogeneous mixture of plant material such as cellulose, hemicellulose, lignin, etc. and filling material such as china clay, calcium carbonate, etc., chemical additives such as rosin, alum, starch, etc. depending on the grade of the paper. Typically the paper layer is comprised of >80% cellulosic fiber, together with one or more binders, optical brighteners, coatings and/or other chemicals.

In various embodiments, the thicknesses of the respective layers may comprise:
- a paper layer in a thickness range of 1 to 50 mil (0.001 to 0.050 inch);
- a metal (e.g., aluminum) foil layer of 0.3 to 3.5 mil (0.0003 to 0.0035 inch);
- a heat seal layer of 0.2 to 3.5 mil (0.0002 to 0.00035 inch);
- a perforation depth of from 2% to 99% of the overall liner thickness, where the perforation must extend completely through the metal foil layer and leave at least a portion of the paper layer thickness un-perforated.

The liner of the present invention provides a simple, cost effective solution that will allow consumers to sample the scent or aroma of a product while the liner remains secured to the container. As a result, manufacturers currently selling products without seals will now be able to include liners on their containers and receive the benefits that seals provide, including maintaining product integrity and barrier properties, extending shelf life, providing tamper evidence, preventing leakage, preventing products from being contaminated and/or damaged by consumers sampling the products, and/or otherwise creating an un-saleable product due to leakage, contamination or damage.

While the invention has been described and illustrated in various terms and embodiments, the scope of the invention is not intended limited thereby and other modifications or embodiments as may be suggested by the teachings herein are particularly reserved as they fall within the scope of the appended claims.

The invention claimed is:

1. A method of sealing a container that allows for aroma or scent detection of a solid substance held in the sealed container, comprising the steps of:
    providing a container having an opening in communication with an internal chamber;
    providing a solid substance having an aroma or scent in the internal chamber;
    providing a non-venting one-piece, partially perforated multilayer induction heat seal liner including a bottom heat seal layer for sealing around the opening of the container, a paper layer, and a metal foil layer between the heat seal layer and the paper layer; and
    affixing by inductive heat sealing the bottom heat seal layer of the liner around the opening to restrict access to the solid substance in the internal chamber while allowing the aroma or scent thereof to permeate through the partially perforated liner for detection by a human nose;
    the liner being configured to allow for said detection via a partial perforation extending in a thickness direction completely through the metal foil layer and in a range of 2% to 99% of a total liner thickness, leaving the paper layer with an unperforated thickness that permits permeation for said detection, and wherein the liner does not include either a liquid barrier layer or a gas permeable vent.

2. The method of claim 1, wherein the solid substance is one or more of: a) a solid mass, b) a solid in the form of a powder, particulate or granular substance, and c) a cream or gel that maintains a fixed shape in the container and is not a flowing liquid.

3. The method of claim 1, wherein the total liner thickness is in a range of 1.5 mils to 57 mils.

4. The method of claim 1, wherein the partial perforation is formed by a laser or mechanical cutting.

5. The method of claim 1 wherein the partial perforation includes one or more partial perforations in the form of a curved, linear, arrow or wave shape.

6. The method of claim 1 wherein the length, width, depth and angle of the partial perforation is configured to allow the aroma or scent of the solid substance in the chamber to permeate through the partial perforation including the unperforated thickness of the paper layer, and to restrict leakage by the solid substance through the liner.

7. The method of claim 1 wherein the liner includes a further layer or coating having printed or informational content, and wherein the further layer or coating is configured to allow the aroma or scent of the solid substance in the chamber to permeate through the partial perforation including the un-perforated thickness of the paper layer.

8. The method of claim 1 wherein:
    the paper layer has a thickness in a range of 1-50 mil;
    the metal foil layer has a thickness in a range of 0.3-3.5 mil;
    the heat seal layer has a thickness in a range of 0.2-3.5 mil.

9. The method of claim 8 wherein:
    the liner has a total thickness in a range of 1.5 mils-57 mils.

10. The method of claim 1 wherein the solid substance is a food substance.

11. The method of claim 10 wherein the food substance is selected from one or more of coffee and spice.

12. The method of claim 1 wherein the paper layer comprises wood fiber or other cellulose fiber.

13. The method of claim 1 wherein the partial perforation extends completely through both the metal foil layer and the heat seal layer.

14. The method of claim 1 wherein the paper layer is comprised of greater than 80% cellulosic fiber.

15. The method of claim 1 wherein the partial perforation leaves an unperforated thickness of the paper layer of at least 1% of the total paper layer thickness.

16. The method of claim 1 wherein the partial perforation leaves an unperforated thickness of the paper layer of at least 50% of the total paper layer thickness.

17. The method of claim 1 wherein the partial perforation leaves an unperforated thickness of the paper layer of at least 80% of the total paper layer thickness.

18. An induction heat seal liner for a container that allows for aroma or scent detection of a solid substance contained in the sealed container, the liner comprising:
    a non-venting one-piece, partially perforated multilayer induction heat seal liner configured to be sealed around an opening of a container that communicates with an internal chamber holding a solid substance having an aroma or scent;

the liner including a bottom heat seal layer for sealing around the opening of the container, a paper layer, and a metal foil layer between the bottom heat seal layer and the paper layer;

the bottom heat seal layer being affixed by inductive heat sealing around the opening to restrict access to the solid substance in the internal chamber while allowing the aroma or scent thereof to permeate through the partially perforated liner for detection by a human nose;

the liner being configured to allow for said detection via a partial perforation extending in a thickness direction completely through the metal foil layer and in a range of 2% to 99% of a total liner thickness, leaving the paper layer with an unperforated thickness that permits permeation for said detection, and wherein the liner does not include either a liquid barrier layer or a gas permeable vent.

19. The liner of claim 18, wherein the length, width, depth and angle of the partial perforation is configured to allow the aroma or scent of the solid substance in the chamber to permeate through the partial perforation including the unperforated thickness of the paper layer, and to restrict leakage by the solid substance through the liner.

20. The liner of claim 18 wherein:

the paper layer has a thickness in a range of 1-50 mil;

the metal foil layer has a thickness in a range of 0.3-3.5 mil;

the heat seal layer has a thickness in a range of 0.2-3.5 mil.

21. The liner of claim 20 wherein:

the liner has a total thickness in a range of 1.5 mil-57 mil.

22. The liner of claim 18, wherein the partial perforation extends completely through both the metal foil layer and the heat seal layer.

* * * * *